UNITED STATES PATENT OFFICE.

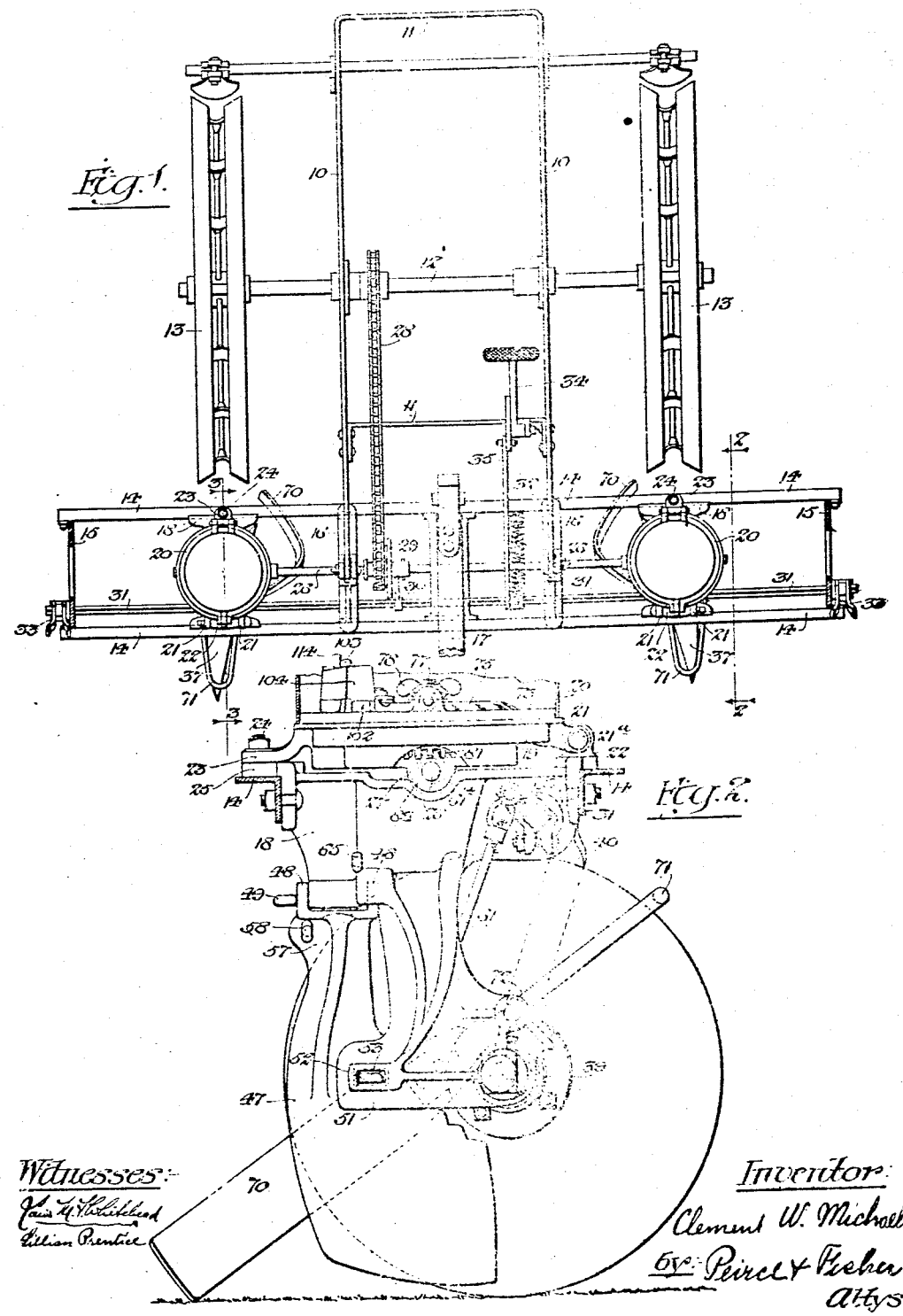

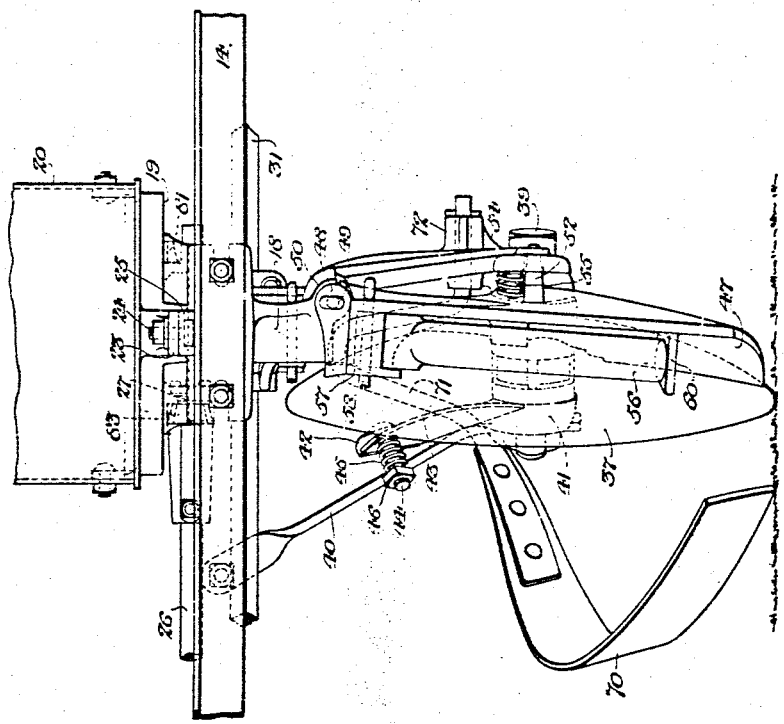

CLEMENT W. MICHAEL, OF RACINE, WISCONSIN, ASSIGNOR TO J. I. CASE PLOW WORKS, OF RACINE, WISCONSIN, A CORPORATION.

PLANTER.

No. 881,193.      Specification of Letters Patent.      Patented March 10, 1908.

Application filed July 11, 1906. Serial No. 325,571.

*To all whom it may concern:*

Be it known that I, CLEMENT W. MICHAEL a citizen of the United States, and a resident of Racine, county of Racine and State of Wisconsin, have invented certain new and useful Improvements in Planters, of which the following is a full, clear, and exact description.

The invention relates to planters and more particularly to planters employing revolving furrow-opening disks.

The invention seeks to provide a shield and seeding devices in connection with such a disk which are so hung as to be free to move slightly to follow the variations of the revolving disk, so that the shield will at all times be in engagement with the side of the disk and seed accurately dropped in the furrow formed thereby.

A further object of the invention is to provide an improved covering blade in connection with the disk.

With these and other objects in view the invention consists in the features of construction, combinations and arrangements of parts hereinafter set forth, illustrated in the accompanying drawings and more particularly pointed out in the appended claims.

In the drawings, Figure 1 is a plan view of the planter to which the present improvements are applied. Fig. 2 is a view in elevation of the furrow-forming and seeding devices with parts of the frame shown in section on line 2—2 of Fig. 1, and with the body of the seed hopper shown in central section. Fig. 3 is a detail section on line 3—3 of Fig. 1. Fig. 4 is a rear view of the parts shown in Figs. 2 and 3.

The main frame of the planter comprises the side bars 10 connected by cross bars 11 and carried upon the axle 12 of the supporting and covering wheels 13. The seeding and furrow-forming devices are carried upon a forward frame comprising the front and rear bars 14 connected at their ends by cross pieces 15 and intermediate their ends by cross pieces 16. The side bars 10 are pivoted as usual to the cross pieces 16 of the front frame. The draft pole 17 is connected to the front frame and suitable means (not shown) are provided for raising and lowering the front frame to and from working position.

Suitable castings or supports 18 (see Figs. 1 and 2) are secured between the front and rear bars 14 of the forward frame and the cast bottom portions 19 of the seed cans or hoppers 20, are mounted upon the supports 18. In the form shown (see Figs. 2 and 3) the hopper bottoms 19 are provided at the front with a lug or lugs 21 that are connected by a pivot bolt 21ª to a lug 22 on the support casting 18. At the rear, the hopper bottoms are provided with a lug 23 secured by bolts 24 to a lug 25 on the casting.

A drive shaft 26 is journaled in cross bars 16 of the front frame and, at its ends, in lugs 27 depending from the hopper bottoms 19. This shaft is driven from the wheel axle 20 by a sprocket chain 28 which preferably rotates the shaft 26 through the medium of a clutch mechanism 29 thereon. This clutch mechanism may be of any suitable construction and is controlled by a dog 30 upon a check-row rock-shaft 31. This shaft is journaled at its ends in the supporting castings 18 and is yieldingly held in normal position by a spring 32. At its ends the rock-shaft 31 is provided with the usual check-row forks 33. The foot trip 34 on the frame is connected to the check-row rock-shaft 31 by a link 35 so that the latter may be shifted when it is desired to plant in drills rather than in check-rows. The parts thus far described may be of any usual or desired construction.

The bottom of the seed hopper (see Fig. 3) is provided with suitable seed delivery mechanism by which the seeds are delivered through a discharge opening 36 in the hopper bottom 19. The casting 18 extends downwardly on the convex side of the furrow-opening disk 37 in the form of a support or boot, and is provided (see Fig. 3) at its upper rear portion with a seed conduit 38 arranged beneath the discharge opening 36 of the seed hopper. The concavo-convex furrow-opening disk 37 is arranged on the inside of the supporting casting or boot 18 and is mounted to rotate upon a stud or bolt 39 which extends through the lower forward portion of the support or casting 18. There are two of these furrow-opening disks, as indicated in Fig. 1, one for each of the feeding mechanisms at the opposite ends of the forward frame. The concave sides of the disk face inwardly and are forwardly and outwardly inclined, as shown, to properly form the furrows in which the seed is planted. The parts associated with each of these disks are alike so that but one of the seeding mechanisms need be described in detail.

From the inner end of the bolt or stud shaft 39, whereon the disk 37 is journaled, extends a brace rod 40 (see Figs. 2 and 4) which extends upwardly and inwardly and is secured to the front bar 14 of the forward frame. A collar 41 fixed to the inner end of the stud or bolt 39 (see Fig. 4) carries an arm 42 and a scraper blade 43 is mounted upon a bolt 44 at the upper end of the arm. A spring 45 coiled about the bolt extends between the nut 46 thereon and the scraper blade 43 and serves to press the scraper blade against the concave side of the disk.

A shield 47 is arranged to coöperate with the furrow-opening disk to keep the furrow clear for the proper deposit of seed therein. The forward edge of this shield is inturned, as shown in Fig. 4, and engages the lower portion of the disk slightly in rear of the center thereof. The forward edge of the shield is shaped to conform with the outline of the disk so as to snugly engage the convex side thereof. In order that the shield may conform to any variation in the side face of the disk as the latter revolves, it is pivoted to swing laterally. For this purpose, the shield in the form shown is provided at its upper end with a pair of upwardly projecting lugs 48 (see Figs. 2 and 3) and a pivot pin or bolt 49 extends through these lugs and through a pair of depending lugs 50 at the upper, rear portion of the casting or boot 18. The pivot pin 49 is arranged substantially parallel to the plane of the furrow-opening disk 37 so that the shield 47 may swing laterally and properly conform to any variations in the side face of the disk as the latter revolves. The shield extends downwardly from its pivot inside of a rearwardly extending projection 51 (see Figs. 2 and 4) at the lower rear portion of the supporting boot or casting 18. A lug 52 projecting outwardly from the outer face of the shield extends through an opening 53 in the projection 51 of the supporting boot. The weight of the shield is thus largely carried directly upon the main body of the support or boot 18 so that the pivot pin 49 of the shield is relieved from undue strain. To further relieve the pin from any twisting strain, the shield is held against twisting by making the lug 52 and the opening 53 of rectangular form, as shown. The shield is however, free to move laterally about the pivot pin 49 so that it may at all times snugly engage the convex side of the disk as the latter revolves. A cushion spring 54 arranged on a stud 55 projecting from the outer face of the shield, extends between the shield and the projection 51 of the supporting boot and this spring serves to press the shield toward the disk and yieldingly hold the same into engagement therewith.

Suitable means are provided for conducting the seed from the conduit 38 of the boot downwardly between the disk 37 and shield 47, and a valve device is provided for controlling the delivery of the seed for planting in hills. This valve device is mounted on the shield to move laterally therewith in following variations in the side of the disk, and is preferably in the form of a chute 56, the upper end of which is arranged within a box-like portion 57 at the upper end of the shield. A transverse pivot 58 extends through the box-like portion 57 at the upper portion of the shield and through a rearwardly projecting lug 59 at the upper end of the valve chute or tube 56. The chute is arranged in line with and communicates with the seed conduit 38 of the boot 18 and its lower end is normally closed by a lip or shelf 60 on the inner face of the shield and projecting inwardly therefrom. A link 61 pivotally engages a lug 62 at the lower end of the chute 56 and extends upwardly and forwardly therefrom (see Fig. 3). The upper end of this link is connected to a short rock-arm 63 on the check-row shaft 31. The link is preferably adjustably threaded into a coupling piece 61ª which is pivotally connected to the end of the arm 61. It will be seen that the valve chute 56 is carried on the shield 37, so as to swing laterally therewith about the pivot pin 49 in following any variation in the side face of the disk so that the seed will always be properly deposited in the furrow formed by the disk. The chute however, in the form shown, may also be swung or vibrated back and forth about the pivot pin 58 independently of the shield 37, so that its lower end may be shifted into and out of line with the shelf 60 to open and close the chute and deposit the seed as required in check-row or hill planting.

A check valve 64 (see Fig. 3) is arranged within the seed conduit 38 at the upper rear portion of the supporting boot or casting 18. This check valve is pivoted at its lower end upon a cross pin 65 and is provided with a forwardly extending arm 66 that is connected by a link 67 to a forwardly projecting arm 68 on the upper portion of the seed chute 56. The link 67 is by preference adjustably threaded into a coupling piece 69 which is pivoted to the end of the arm 68.

In check-row planting the rock-shaft 31 is held by its spring 32 with the forks 33 in forward position, as shown in Fig. 1, and, as shown in Fig. 3, the check valve 64 normally closes the conduit 38 and the seed chute 56 is normally in engagement with the shelf 60 so that the lower end thereof is closed. The seeding mechanism within the hopper is preferably arranged to accumulate the seeds, one at a time upon the valve 64, as the machine travels between rows. When the check-row wire operates on the fork 33 and oscillates the rock-shaft 31, the spout 56 is vibrated rearwardly to project the hill of corn on the shelf 60 into the furrow, and the hill accumulated on the check valve 64 falls through the conduit 38 and chute 56 and is caught by the return movement thereof upon the shelf 60. In drill planting the rock-shaft 31 is shifted to hold the valve 64 and chute 56 in open position.

A curved covering blade 70 is arranged to turn the earth into the furrow over the deposited corn and this blade is mounted upon a U-shaped supporting arm 71, the outturned end of which is pivoted or journaled in a transverse sleeve or lug 72 at the forward lower portion of the supporting boot or casting 18. From its pivot on the convex side of the disk the U-shaped arm 71 extends forwardly and over the disk to the concave side thereof and is secured to the forward end of the covering blade 70. The forwardly projecting arm 71 partially counter balances the weight of the covering blade so that the latter may float as it passes over irregularities in the ground. When the seeding devices are lifted from working position the outer end of the U-shaped arm 71 strikes against the upper forward portion of the casting or boot 18 and thus acts as a stop to prevent the covering blade from swinging too far in downward direction. Any suitable form of mechanism for discharging seed from the hopper may be employed. In the form shown (see Fig. 3) the bottom 19 of the hopper is provided at its edge with an upwardly projecting flange 73 which is preferably cut away or outwardly inclined at its upper portion, as indicated at 74. A cap or cover plate 75 is mounted upon a central raised portion 76 of the hopper bottom and its outer downturned edge portion forms, with the flange 73 of the hopper bottom, an annular feedway through which the kernels of corn are delivered to the cells of the seed plate rotating below the cap plate. A central stud or bolt 77 extends through the raised portion 76 on the hopper bottom and through the cap plate and a winged-nut 78 thereon removably holds the cap plate or cover 75 in position. A piece 79 is held in place by a bolt 80 beneath the lower headed-end of the stud 77 so that the latter cannot fall from position when the thumb nut 78 is removed. An annular beveled gear 81 is arranged within an annular groove or recess 82 in the hopper bottom and meshes with a beveled pinion 83 upon the shaft 26. The gear is provided with an inwardly projecting horizontal flange 84 which engages a rabbet or shoulder 85 in the hopper bottom and is rotatably sustained in position thereby. The gear is also provided with an upwardly projecting flange 86. The annular seed plate 88 having cells 89 is held in position between the hopper bottom and the cover or cap plate 75 and between the upright flange 73 of the hopper bottom and the upright flange 86 of the drive gear 81. The seed plate is provided with inwardly projecting lugs 87 that engage notches in the vertical flange 86 of the gear so that the plates are connected to the ratchet with the gear.

The cap plate or cover 75 is provided at one portion of its periphery with an outwardly projecting flange 98, the outer edge of which rests upon the hopper bottom, (see Fig. 3). A cut-off 102 (see Fig. 2) is provided with a stem 103 extending upwardly through a casing 104. This casing is arranged over the flange 98 of the cap plate and is secured to the latter by a bolt 105. A seed ejector or expeller 108 is arranged below the flange 98 and over the discharge opening 36. A secondary cut-off or guide finger 113 is arranged in front of the ejector and upon the end of a stem 114 guided in the casing 104.

It is obvious that the hopper may be provided with any suitable form of seed discharging mechanism and that numerous changes may be made in the details of structure set forth without departure from the essentials of the invention.

Having described my invention, what I claim as new and desire to secure by Letters Patent, is:—

1. The combination with the frame having a seed delivery conduit, of a revoluble furrow opening disk, a shield held against the side of said disk, and a valve device operating between said shield and disk, said shield and valve device being mounted to move at right-angles to the disk and free to follow any lateral variation of the disk as the latter revolves, substantially as described.

2. The combination with the frame having a seed delivery conduit, of a revoluble, concavo-convex furrow opening disk journaled at an angle on said frame, a shield on the convex side of said disk having its forward edge shaped to conform thereto, said shield being movably mounted and free to follow any lateral variation of the disk as the latter revolves, and a seed chute between said shield and disk and connected to said shield to move laterally therewith, substantially as described.

3. In a planter, the combination with the frame having a seed delivery conduit, of a furrow opening disk journaled at an angle on said frame, a coöperating shield, said shield being pivotally mounted on said frame to swing at right angles to said disk, a spring for yieldingly holding said shield into engagement with the convex side of said disk, and a seed chute between said shield and disk and mounted on said shield, substantially as described.

4. In planters, the combination with the inclined furrow opening disk, of a shield mounted on the convex side of said disk and coöperating therewith, a seed chute between said shield and disk, said shield and chute being mounted to move laterally at right-angles to the disk and free to follow any variation of said disk as the latter revolves, substantially as described.

5. In planters, the combination with a frame having a seed delivery conduit, of a furrow opening disk journaled on said frame, a shield on the convex side of said disk, a valve device connected to said shield, said shield being pivoted on said frame and arranged to move together with said valve device to follow any variation of the side of said disk as the latter revolves, substantially as described.

6. In planters, the combination with the frame having a seed delivery conduit, of a furrow opening disk journaled on said frame, a shield on the convex side of said disk, said shield being pivoted to said frame to swing laterally and a valve device connected to said shield and operating between said shield and disk, substantially as described.

7. In planters, the combination with the frame having a seed delivery conduit, of a furrow opening disk journaled on said frame, a shield movably mounted on the frame and yieldingly held against the convex side of said disk and a valve device operating between said disk and shield, said valve device being mounted on and movable with said shield, substantially as described.

8. In planters, the combination with the frame, of a furrow opening disk journaled on said frame, of a shield pivoted on said frame and yieldingly spring-held against the convex side of said disk, a vibratory seed chute pivoted on said shield and means for operating said seed chute, substantially as described.

9. In planters, the combination with the frame having a seed delivery conduit, of a revoluble, concavo-convex, furrow opening disk journaled on said frame, a shield pivoted on the frame to swing laterally and yieldingly spring-held against the convex side of said disk, a valve device mounted on said shield to move laterally therewith and pivoted on the shield to vibrate from front to rear independently thereof and check-row mechanism for vibrating said valve device, substantially as described.

10. In planters, the combination with the supporting boot having a seed conduit, of a furrow opening disk journaled at an incline on said boot, a shield pivotally mounted on said boot and yieldingly held against the convex side of said disk, a vibratory seed chute pivoted on said shield and communicating with said conduit, said shield having a shelf for normally closing the lower end of said chute, and means for vibrating said chute, substantially as described.

11. In planters, the combination with the supporting boot having a seed conduit, of a furrow opening disk journaled at an incline on said boot, a shield pivotally mounted on said boot and yieldingly held against the convex side of said disk, a vibratory seed chute pivoted on said shield and communicating with said conduit, said shield having a shelf for normally closing the lower end of said chute, a valve in the conduit of said boot, connections between said valve and said chute and check-row mechanism for vibrating said chute, substantially as described.

12. In planters, the combination with the frame, of a furrow opening disk journaled on the frame and a covering blade having a supporting arm pivoted on the convex side of the disk and extending around the disk to the concave side thereof, substantially as described.

13. In planters, the combination with the frame, of a furrow opening disk journaled on said frame and a covering blade having a U-shaped supporting arm which is pivoted to said frame on the convex side of said disk and extends forwardly and around the disk to the concave side thereof, said forwardly extending supporting arm serving as a counter-balance to cause said covering blade to float, substantially as described.

CLEMENT W. MICHAEL.

Witnesses:
DANIEL E. HOWELL,
ARTHUR J. SWENSON.